【19】 United States Patent
Day et al.

[11] Patent Number: 6,140,461
[45] Date of Patent: Oct. 31, 2000

[54] METHOD FOR PREPARING SOLID STATE POLYCARBONATES IN A UNITARY SERIES OF OPERATIONS

[75] Inventors: James Day, Scotia, N.Y.; Bhaskar Bhairavnath Idage, Pune, India

[73] Assignee: General Electric Company, Schenectady, N.Y.

[21] Appl. No.: 09/371,449

[22] Filed: Aug. 10, 1999

[51] Int. Cl.[7] .................................................. C08G 59/00
[52] U.S. Cl. ............................ 528/404; 528/196; 528/198
[58] Field of Search ..................................... 528/196, 198, 528/404

[56] References Cited

U.S. PATENT DOCUMENTS

| | | | |
|---|---|---|---|
| 4,948,871 | 8/1990 | Fukuoka et al. | 528/481 |
| 5,204,377 | 4/1993 | Fukawa et al. | 521/60 |
| 5,214,073 | 5/1993 | Fukawa et al. | 521/60 |

*Primary Examiner*—Terressa Boykin
*Attorney, Agent, or Firm*—Robert T. Barker; Noreen C. Johnson

[57] ABSTRACT

Amorphous precursor polycarbonates, such as oligomers, are converted to high molecular weight polycarbonates in a unitary series of operations that includes contact with an alkanol having a boiling point up to about 180° C. and heating the resulting wetted particles so as to effect solid state polymerization. Heating is at progressively increasing temperatures from below the boiling point of the alkanol to a final level between the Tg and the melting temperature of said enhanced crystallinity polycarbonate.

20 Claims, No Drawings

METHOD FOR PREPARING SOLID STATE POLYCARBONATES IN A UNITARY SERIES OF OPERATIONS

BACKGROUND OF THE INVENTION

This invention relates to polycarbonates, and more particularly to a method for their preparation by solid state polymerization.

Solid state polymerization (hereinafter sometimes "SSP") of polycarbonates is disclosed, for example, in U.S. Pat. No. 4,948,871, 5,204,377 and 5,214,073, the disclosures of which are incorporated herein. It involves three steps: a first step of forming a prepolymer, typically by melt polymerization (i.e., transesterification) of a dihydroxyaromatic compound such as bisphenol A with a diaryl carbonate such as diphenyl carbonate; a second step of crystallizing the prepolymer; and a third step of building the molecular weight of the crystallized prepolymer by heating to a temperature between its glass transition temperature (Tg) and its melting temperature. Use of this polymerization method is of increasing interest by reason of its effectiveness and environmental benefits.

The second or crystallization step of this method is performed, according to said patents, by solvent treatment or heat treatment. As described, the solvent treatment method may in fact employ a good or poor solvent for the prepolymer, with contact involving either the liquid or vapor form thereof. Illustrative "solvents" include aliphatic aromatic hydrocarbons, ethers, esters, ketones and halogenated aliphatic and aromatic hydrocarbons.

More recent teachings have described SSP methods that require only surface crystallization of the precursor polycarbonate particles. For example, according to copending, commonly owned application Serial No. 08/986,448 surface crystallization is effected by contact, typically at a temperature in the range of about 20–50° C., with at least one dialkyl carbonate, optionally in the presence of another non-solvent such as water or a $C_{1-4}$ alkanol. Alternatively, copending, commonly owned application Serial No. [RD-26032] describes a crystallization method in which contact is with water or a $C_{1-20}$ alkanol in the liquid or vapor state, within a specifically defined temperature range which begins well below the boiling point of the water or alkanol.

SUMMARY OF THE INVENTION

It would be more convenient and desirable, however, to achieve crystallinity enhancement and SSP in a unitary series of operations, not requiring a separate step of contact of the amorphous precursor polycarbonate with a non-solvent or other liquid. The present invention makes this possible.

The invention is a method for preparing a polycarbonate which comprises:

contacting particles of a solid, amorphous precursor polycarbonate with an amount effective to wet said particles of at least one alkanol in the liquid state, said alkanol having a boiling point up to about 180° C.; and heating the resulting wetted particles to produce an enhanced crystallinity precursor polycarbonate and effect solid state polymerization thereof, said heating being at progressively increasing temperatures from below the boiling point of said alkanol to a final level between the glass transition temperature and the melting temperature of said enhanced crystallinity polycarbonate.

DETAILED DESCRIPTION; PREFERRED EMBODIMENTS

The present invention may be understood more readily by reference to the following detailed description of the preferred embodiments of the invention and the examples included therein.

Before the present method and apparatus are disclosed and described, it is to be understood that this invention is not limited to specific systemic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meaning.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

"Nonsolvent" is herein defined as a substance having a prepolymer solubility of less than 10 percent.

"Solvent" is herein defined as substance that penetrates the prepolymer.

Polycarbonates which may be prepared by the method of this invention typically comprise structural units of the formula

(I)

wherein at least about 60% of the total number of R groups are aromatic organic radicals and the balance thereof are aliphatic, alicyclic, or aromatic radicals. Preferably, each R is an aromatic organic radical and more preferably a radical of the formula

 (II)

wherein each $A^1$ and $A^2$ is a monocyclic divalent aryl radical and Y is a bridging radical in which one or two carbonate atoms separate $A^1$ and $A^2$. Such radicals are derived from dihydroxyaromatic compounds of the formulas HO—R—OH and HO—$A^1$—Y—$A^2$—OH respectively. For example, $A^1$ and $A^2$ generally represent unsubstituted phenylene, especially p-phenylene which is preferred, or substituted derivatives thereof. The bridging radical Y is most often a hydrocarbon group and particularly a saturated group such as methylene, cyclohexylidene, or isopropylidene which is preferred. Thus, the most preferred polycarbonates are those derived entirely or in part from 2,2-bis(4-hydroxyphenyl) propane, also known as "bisphenol A".

The essential starting material in the method of this invention is a precursor polycarbonate. It may be a polycarbonate oligomer of the type produced by the first step of a melt polycarbonate process or by bischloroformate oligomer preparation followed by hydrolysis and/or endcapping and isolation. Such oligomers most often have a weight average molecular weight (Mw) in the range of about 2,000–10,000 as determined by gel permeation chromatography which may be relative to polycarbonate or polystyrene, and an intrinsic viscosity in the range of about 0.06–0.30 dl/g, all intrinsic viscosity values herein being as determined in chloroform at 25° C.

Both homopolymer and copolymer precursor polycarbonates may be employed. Copolycarbonates include those containing, for example, bisphenol A carbonate structural units in combination with carbonate units derived from other bisphenols or from polyethylene glycols. Also included are copolyestercarbonates, such as those containing bisphenol dodecanedioate units in combination with carbonate units.

It may also be a relatively high molecular weight polycarbonate, generally having an Mw value in the range of about 10,000–35,000, for which it is desired to increase the molecular weight still further; e.g., up to a value in the range of about 50,000–80,000. For example, optical quality polycarbonate which is off-specification may be crystallized by the method of this invention prior to increasing its molecular weight so that it may be used in other applications.

The precursor polycarbonate may be a branched homo- or copolycarbonate, formed by the reaction of a linear polycarbonate or its precursor(s) with a branching agent such as 1,1,1-tris(4-hydroxyphenyl)ethane. Branched copolycarbonates include oligomers and high molecular weight copolycarbonates containing units adapted to maximize solvent resistance. Hydroquinone and methylhydroquinone carbonate units are particularly suitable for this purpose, as disclosed in U.S. Pat. No. 4,920,200. Such units will typically comprise about 25–50% of total carbonate units in the polymer. Conversion to the branched homo- or copolycarbonate may precede or occur simultaneously with the conversion of the precursor polycarbonate to an enhanced crystallinity polymer.

The precursor polycarbonate may also be a recycled polycarbonate. For example, recycled polymer from compact disks may be employed. Its method of original preparation is immaterial; i.e., recycled polycarbonate originally prepared by interfacial polymerization, by melt polymerization or from bischloroformates may be employed.

Such recycled material typically has a molecular weight which has been degraded from that of the originally polymerized material as shown by an intrinsic viscosity in the range of about 0.25–1.0 dl/g. It may be obtained from scrap polycarbonate by dissolution in a chlorinated organic solvent such as chloroform, methylene chloride or 1,2-dichloroethane followed by filtration of the insoluble material or other art-recognized procedures for separation of non-polycarbonate constituents. Other types of polycarbonate, such as interfacially prepared polycarbonate and polycarbonate extruder wastes, may also be employed as precursors.

Prior to performing the first step of the method of the invention, it is within the scope of the invention, particularly when the precursor polycarbonate is a recycled material, to dissolve it in a chlorinated hydrocarbon as solvent. Illustrative chlorinated hydrocarbons are methylene chloride, chloroform, 1,2-dichloroethane, chlorobenzene and o-dichlorobenzene. The chloroaliphatic hydrocarbons are preferred, with methylene chloride and 1,2-dichloroethane being most preferred.

Dissolution of the precursor polycarbonate in the solvent may take place at any temperature. Typical temperatures are from about 0° C. to the boiling point of the solvent, with about 20–100° C. generally being preferred. So long as an amount of solvent effective to dissolve the polycarbonate is employed, its proportion is not critical.

Such dissolution generally leaves behind various insoluble materials, as illustrated by metallic coatings when the precursor polycarbonate is from optical disks, for example. The invention further contemplates removal of said insoluble materials from the polycarbonate solution. This may be achieved by such conventional operations as decantation, filtration and centrifugation.

The recycled polycarbonate is frequently associated with colored impurities, which may appear in the polycarbonate itself or in the solution thereof in the chlorinated solvent. Various embodiments of the invention, therefore, include a step of removing color from the amorphous polycarbonate solution following other removal steps. One method for color discharge is treatment while in solution with a mineral acid, preferably hydrochloric acid, said acid typically being in solution in an alkanol such as methanol. Another is contact of said solution with a solid that absorbs color bodies, such as activated charcoal or a crosslinked resin, which may be neutral or may be an ion exchange resin. Another is washing with a solution of sodium gluconate. Still another is washing of the resin, after precipitation as described hereinafter, with non-solvent in an amount sufficient to dissolve color bodies.

The solution of precursor polycarbonate is, for the most part, freed of any solvent prior to crystallization enhancement. It is usually advantageous to precipitate the precursor polycarbonate therefrom by such art-recognized methods as anti-solvent precipitation or steam precipitation.

According to the invention, the precursor polycarbonate, which may be in the form of pellets or powder, is contacted with at least one alkanol having a boiling point up to about 180° C. The preferred alkanols are $C_{1-10}$ alkanols and especially primary and secondary alkanols, as illustrated by methanol, ethanol, 1-butanol, 2-butanol, 3-pentanol and 3-hexanol. Most preferred are those having boiling points in the range of about 110–170° C., including 3-pentanol and 3-hexanol. Mixtures of alkanols may also be employed.

For the purposes of the present invention, it is neither necessary nor contemplated to employ a dialkyl carbonate as required in the aforementioned application Ser. No. 08/986, 448. The use of alkanols alone is sufficient.

The proportion of alkanol employed, in comparison to precursor polycarbonate, is sufficient to wet the particles of said precursor polycarbonate. Most often, a weight ratio of precursor polycarbonate to alkanol in the range of about 1–5:1 is adequate.

Contact temperatures are subject to wide variation, provided they are progressively increasing as described hereinafter. Thus, initial contact between the precursor polycarbonate and the alkanol may be, for example, at temperatures from ambient (i.e., about 20–30° C.) to about 180° C. All that is required is that the contact temperature initially be such as to maintain the alkanol in the liquid state. If the boiling point of the alkanol is such that this cannot be achieved at atmospheric pressure, the use of superatmospheric pressures is permissible.

Contact between the precursor polycarbonate and alkanol may be in a vessel other than the vessel employed for SSP. A major advantage distinguishing the present invention from the prior art, however, is its adaptability to an integrated process including both crystallinity enhancement and SSP steps. Therefore, it is frequently preferred to charge the SSP vessel separately with alkanol and precursor polycarbonate at a temperature within the operative range and to employ an uninterrupted heating operation from the lower to the upper extremity of the temperature range.

Said contact affords wetted particles of precursor polycarbonate. These particles are then heated at progressively increasing temperatures until a temperature between the Tg and the melting temperature of the enhanced crystallinity polycarbonate, generally at least about 225° C., is reached. Staged heating is often employed, with rapid ramping from one temperature level to the next between instances of maintenance of the temperature at a specific level.

The conditions of heating may include the use of a stream of inert gas such as nitrogen or argon, serving to keep the polycarbonate particles suspended and also to carry away vaporized by-product, as illustrated by monohydroxyaromatic compound such as phenol employed as a chain termination agent in the preparation of the precursor polycarbonate. It is also within the scope of the invention to employ a fluidized bed reactor or the like.

One effect of the progressive heating operation is enhancement of the crystallinity of the polycarbonate. While a crystallinity level above 5% is usually adequate for SSP, the crystallinity actually attained is most often above about 50% and frequently in the range of about 50–70%. Still another effect is, of course, the SSP operation itself. Another effect of the heating operation is evaporation of the alkanol.

The method of the invention is illustrated by the following examples. Molecular weights were determined by gel permeation chromatography relative to polystyrene.

EXAMPLE 1

A tumbling quartz reactor was charged with 15 g of pellets of an amorphous bisphenol A polycarbonate oligomer prepared by melt polymerization and having a Mw of about 9,000 and 4.1 g of 3-pentanol and heated in a tube furnace. Heating was according to the following regime, with a sweep of nitrogen (1 l/min) when the temperature reached 135° C.:

105° C.—1 hour,
135° C.—1 hour,
185° C.—1 hour,
220° C.—2 hours,
240° C.—2 hours.

The 3-pentanol, observed to be a liquid at 105° C., evaporated at 135° C. After the 105° C. stage, the Tg and crystallinity of the polycarbonate product were 110° C. and 20%, respectively. After the 240° C. stage, they were 155° C. and 52%, respectively, and the product Mw was 66,400.

EXAMPLE 2

The reactor of Example 1 was charged with 50 g of the amorphous polycarbonate oligomer and 20 g of 1-hexanol. Heating was according to the following regime, with a sweep of nitrogen (2 l/min) when the temperature reached 180° C.:

100° C.—5 hour,
135° C.—1 hour,
180° C.—1 hour,
220° C.—2 hours,
230° C.—2 hours,
240° C.—2 hours.

The 1-hexanol, observed to be a liquid at 100° and 135° C., evaporated at 180° C. After the 100° C. stage, the Tg of the polycarbonate product was 110° C. After the 135° C. stage, the crystallinity was 30%. After the 240° C. stage, the Mw, Tg and crystallinity were 66,400, 155° C. and 52%, respectively.

This invention has been described in detail with particular reference to preferred embodiments thereof, but it will be understood that variations and modifications can be effected within the spirit and scope of the invention.

What is claimed is:

1. A method for preparing a polycarbonate which comprises:
    contacting particles of a solid, amorphous precursor polycarbonate with an amount effective to wet said particles of at least one alkanol in the liquid state, said alkanol having a boiling point up to about 180° C.; and
    heating the resulting wetted particles to produce an enhanced crystallinity precursor polycarbonate and effect solid state polymerization thereof, said heating being at progressively increasing temperatures from below the boiling point of said alkanol to a final level between the glass transition temperature and the melting temperature of said enhanced crystallinity polycarbonate.

2. A method according to claim 1 wherein the polycarbonate comprises structural units of the formula

(I)

wherein at least about 60% of the total number of R groups are aromatic organic radicals and the balance thereof are aliphatic, alicyclic, or aromatic radicals.

3. A method according to claim 2 wherein R has the formula

(II)

wherein each $A^1$ and $A^2$ is a monocyclic divalent aryl radical and Y is a bridging radical in which one or two carbonate atoms separate $A^1$ and $A^2$.

4. A method according to claim 3 wherein each of $A^1$ and $A^2$ is p-phenylene and Y is isopropylidene.

5. A method according to claim 1 wherein the precursor polycarbonate is a polycarbonate oligomer.

6. A method according to claim 1 wherein the precursor polycarbonate is a high molecular weight polycarbonate.

7. A method according to claim 1 wherein the precursor polycarbonate is a branched polycarbonate.

8. A method according to claim 1 wherein the precursor polycarbonate is a recycled polycarbonate.

9. A method according to claim 1 wherein the alkanol is a primary or secondary $C_{1-10}$ alkanol.

10. A method according to claim 9 wherein the alkanol has a boiling point in the range of about 110–170° C.

11. A method according to claim 9 wherein the alkanol is 3-pentanol.

12. A method according to claim 9 wherein the alkanol is 1-hexanol.

13. A method according to claim 1 wherein the weight ratio of precursor polycarbonate to alkanol is in the range of about 1–5:1.

14. A method according to claim 1 wherein said heating is uninterrupted.

15. A method according to claim 14 wherein said heating begins at a temperature from ambient to about 180° C. and ends at a temperature of at least about 225° C.

16. A method according to claim 14 wherein staged heating is employed.

17. A method according to claim 1 wherein said heating is in a stream of inert gas.

18. A method according to claim 1 wherein said heating is in a fluidized bed.

19. A method for preparing a polycarbonate which comprises:

contacting particles of a solid, amorphous precursor polycarbonate with an amount effective to wet said particles of at least one alkanol in the liquid state, said alkanol being a $C_{1-10}$ alkanol having a boiling point in the range of about 110–170° C.; and heating the resulting wetted particles in an uninterrupted heating operation to produce an enhanced crystallinity precursor polycarbonate and effect solid state polymerization thereof, said heating being at progressively increasing temperatures from a temperature between ambient and about 180° C. to a temperature of at least about 225° C.

20. A method according to claim 19 wherein the polycarbonate is a bisphenol A homo- or copolycarbonate.

\* \* \* \* \*